2,964,488

PROCESS OF POLYMERIZING METHYL ALPHA-CHLOROACRYLATE IN THE PRESENCE OF A CONDENSATION PRODUCT OF NONYL PHENOL AND ETHYLENE OXIDE

Harry D. Anspon, Easton, and Frank E. Pschorr, Phoenixville, Pa., assignors to General Aniline & Film Corporation, New York, N.Y., a corporation of Delaware No Drawing. Filed Apr. 11, 1956, Ser. No. 577,460

1 Claim. (Cl. 260—33.2)

The invention here presented is a new composition of matter and a new process for the preparation of optically clear, smooth surfaced, synthetic resin sheets; the process being particularly adapted to the casting of clear synthetic resins against glass surfaces for the production of transparent sheets.

In the making of synthetic resin articles, the resin is always molded in one way or another, usually in the fluid condition, with or without pressure. In the making of transparent sheets of clear resin it has been found that the best procedure is to cast the polymer such as the acrylate, methacrylate and alpha-chloroacrylate esters (which are all clear colorless substances) between glass sheets; and then polymerize the material while in the mold. This procedure, however, requires that the monomer must adhere to the glass surface through a major portion of the polymerization in order to insure smooth surfaces on the molded article, yet the material must release the mold surface before the shrinkage becomes sufficiently great to tear off particles or flakes of glass from the glass surface. Accordingly it has been found extremely difficult to prepare the polymerizate in such a way, or to provide such a composition as to obtain, in the first place, complete transparency of the finished article; in the second place, sufficient adhesiveness to the glass surface to insure an optically good surface on the resin from the glass, and to obtain a mold release at a point in the polymerization such that the release is obtained before sufficient tension is applied to the mold surface by the shrinkage of the casting to spall off the surface of the glass, i.e. to break out flakes of glass from the casting surfaces of the glass mold.

Various silicone oils have been tried in a wide variety of types, proportions and compositions; but it is found that, with an amount sufficient to obtain release of the resin body from the mold surface before sufficient traction is applied from shrinkage to spall off the glass, the desirable adhesivity during early stages of polymerization is substantially reduced and defective surfaces are frequently obtained. No satisfactory release agent capable of releasing the adhesivity at the proper point has been found until the present invention.

According to the present invention the resin monomer, or a solution of a minor amount of polymer in monomer, is treated with a minute amount—on the order of 0.05%—of an antihesive such as a condensation product of an alkylphenol and an ethylene oxide as shown in U.S. Patents No. 1,970,587 and No. 2,213,477. These materials were developed originally as textile assistants and for surface active properties and the like; such as wetting agents, softening agents, or auxiliary agents for the finishing of textiles, or as emulsifying, washing, and cleaning agents. The wholly unexpected property and value as release agents is most surprising. The preferred form of these agents is obtained by the condensation of approximately 4 molecules of ethylene oxide per molecule of alkylphenol; however all of these condensates are more or less usable.

In practising the invention, a mixture is prepared consisting of the unsaturated monomer which may be an acrylate, a methacrylate, a chloroacrylate ester or the like, either in the monomeric form, or as a solution of a minor amount of polymer in monomer sufficiently low in viscosity to be still fluid. To this monomer there is added approximately 0.05% of the ethylene oxide-alkyl phenol condensate which is then thoroughly dispersed in the acrylate monomer. A substantial control of the point at which the mold release action occurs, can be obtained; either by choice of the amount of material added, or by choice of the particular condensate; the amount required being practically always well under 1%. The mixture is then poured into the mold, preferably a mold made up of glass sheets with an interposed spacer to yield the desired thickness of the finished sheet. The filled mold is then placed in the oven and heated until polymerization is complete. During this procedure, the initial polymerization occurs under conditions where the glass sheet is wetted by the monomer; and as the polymerization progresses, the partially hardened resin adheres to the glass to give the sharp reproduction of the smooth glass surface. When a state of approximately complete polymerization has occurred, the resin is released from the glass mold surface and is annealed to its final stage of hardness and completed shrinkage without adhesion to the glass surface and without distortion of the resin surface.

It will be observed that the ethylene oxide-alkyl phenol material serves as an antihesive (or abhesive) agent which does not function until a condition of approximate solidity is obtained in the casting, sufficient to avoid distortion from the weight of the resin in the mold, whereupon the mold release effect comes into play and allows the cast resin to be separated from the glass surface without spalling of the glass surface.

Other objects and details of the invention will be apparent from the following description.

*Example 1*

Methyl alpha-chloroacrylate cast in a Pyrex glass tube and sealed off under prepurified nitrogen was polymerized by diffuse daylight. After the liquid monomer had polymerized beyond the point where it would no longer flow, the Pyrex casting tube cracked. A similar experiment with methyl alpha-chloroacrylate cast in a plate glass sheet casting mold gave identical results. After the polymerization had progressed beyond the flow point, the glass casting sheets suddenly cracked. In both cases some of the polymer actually broke out pieces of glass from the surface of the glass mold.

*Example 2*

These tests were repeated after the addition to the monomer of approximately 0.05% of a molecularly distilled condensation product of nonylphenol and ethylene oxide; and in both instances of repetition with this agent added, the polymer hardened to a complete cure without damage to the glass, and the cured polymer was readily removed from the glass mold.

It may be noted that this type of breakage of glass molds which occurs when the polymer is cast in glass sheet molds is quite different from the breakage which occasionally occurs due to a polymer "lip" formed over the edge of the glass mold; since a polymer "lip" is a purely mechanical interlock, whereas the spalling of the glass surface and the cracking, in the absence of a polymer lip, are due entirely to adhesion of the polymer to the glass surface; and it is this adhesion which is diminished by the antihesive properties of the condensation product of nonylphenol and ethylene oxide.

It may be noted also that the very small quantity required makes this added treatment step a very inexpensive one since the condensation product of nonylphenol and ethylene oxide is low in cost and the quantity is so minute as to be negligible in cost.

Thus, the process and composition of the invention avoids the adhesivity of acrylate polymers to glass when they are cured in a glass mold, by the addition of a minute quantity in the range of 0.001% to 1.0% based on the weight of monomer (or polymer), preferably 0.01 to 0.5%, of the condensation product of nonylphenol and ethylene oxide to the unpolymerized acrylate material.

While there are above disclosed but a limited number of embodiments of the process and product of the invention it is possible to provide still other embodiments without departing from the inventive concept herein disclosed; and it is therefore desired that only such limitations be imposed upon the appended claim as are stated therein.

The invention claimed is:

In the process of producing clear castings of methyl alpha-chloroacrylate wherein monomeric methyl alpha-chloroacrylate is cast between glass surfaces forming a mold and polymerized in contact with the glass by subjecting the glass mold containing the monomeric methyl alpha-chloroacrylate to the action of heat, the improvement which comprises reducing the adhesion to the glass of the polymer thus formed and thereby preventing breakage and like damage to the glass by adding to the monomer prior to the polymerization with intimate mixing from 0.001 to 1% by weight of the monomeric methyl alpha-chloroacrylate of an anhydrous surface active agent consisting of the condensation product of nonylphenol with 4 molar proportions of ethylene oxide.

References Cited in the file of this patent

UNITED STATES PATENTS

| | | |
|---|---|---|
| 2,213,477 | Steindorff et al. | Sept. 3, 1940 |
| 2,353,228 | Ducca | July 11, 1944 |

FOREIGN PATENTS

| | | |
|---|---|---|
| 572,844 | Great Britain | Oct. 25, 1945 |
| 510,895 | Canada | Mar. 15, 1955 |

OTHER REFERENCES

"Modern Plastics," volume 30, page 144, columns 2 and 3, October 1955.

"Chemistry of Commercial Plastics," Wakeman, pages 473, 474, Reinhold Publishing Co., New York, N.Y., 1947.

"Handbook of Material Trade Names," page 292, 1953 edition, Zimmerman et al., Industrial Research Service, Dover, N.H.